United States Patent
Germunson et al.

[19]

[11] Patent Number: 6,000,200
[45] Date of Patent: Dec. 14, 1999

[54] BAGGING APPARATUS

[75] Inventors: Gary G. Germunson, Yakima; Miles Taggart Hanon, Des Moines, both of Wash.

[73] Assignee: Yakima Wire Works, Yakima, Wash.

[21] Appl. No.: 08/953,162

[22] Filed: Oct. 17, 1997

[51] Int. Cl.$^6$ ................................................ B65B 1/32
[52] U.S. Cl. ................................ 53/502; 53/154; 53/237; 53/284.7
[58] Field of Search ............................. 53/168, 237, 502, 53/154, 570, 284.7

[56] References Cited

U.S. PATENT DOCUMENTS

| | | |
|---|---|---|
| 3,822,527 | 7/1974 | Germunson . |
| 4,018,029 | 4/1977 | Safranski et al. ....................... 53/502 |
| 4,177,621 | 12/1979 | Powell, Jr. . |
| 4,253,292 | 3/1981 | Lipes . |
| 4,382,527 | 5/1983 | Lerner . |
| 4,428,179 | 1/1984 | Jordan et al. . |
| 4,607,478 | 8/1986 | Maglecic ................................ 53/502 |
| 4,720,961 | 1/1988 | Jordan .................................... 53/502 |
| 4,813,205 | 3/1989 | Mikata et al. ....................... 53/502 X |
| 5,001,889 | 3/1991 | Mueller .................................. 53/502 |
| 5,024,047 | 6/1991 | Leverett . |
| 5,050,370 | 9/1991 | Stederoth ............................... 53/502 |
| 5,174,094 | 12/1992 | Powell, Jr. . |
| 5,191,947 | 3/1993 | Petersen . |
| 5,331,792 | 7/1994 | Kitchen .................................. 53/502 |
| 5,339,607 | 8/1994 | Regier ................................ 53/502 X |
| 5,340,269 | 8/1994 | Caridis et al. ..................... 53/502 X |
| 5,345,748 | 9/1994 | Powell, Jr. . |
| 5,737,904 | 4/1998 | Simionato ............................. 53/502 |
| 5,813,195 | 9/1998 | Nielsen et al. ..................... 53/502 X |

*Primary Examiner*—Daniel B. Moon
*Attorney, Agent, or Firm*—Seed and Berry LLP

[57] ABSTRACT

An apparatus and method for accumulating specified weights of objects, such as apples, and delivering them to a plurality of off-load conveyors, the off-load conveyors delivering the apples to chutes which can then guide the apples into a single bagging apparatus. The flow of the apples on the chutes is controlled by a gate overlying all the chutes and a speed control brush that rotates at a desired speed to control the flow rate of the apples down the chute into the bagger. The apparatus and method are controlled by the interaction of a computer and a programmable logic controller.

11 Claims, 5 Drawing Sheets

6,000,200

BAGGING APPARATUS

TECHNICAL FIELD

This invention relates to economically filling bags to a specified weight with objects, such as apples.

BACKGROUND OF THE INVENTION

This invention relates to a device which can take objects, such as apples, from a sorting conveyor in which the apples are individually weighed in pockets in the conveyor and then bagging those apples into a conventional bagger. Apples are off-loaded from the sorter conveyor into a plurality of chutes that feed each bagger.

Heretofore objects, such as apples, that are collected or bagged from sorting conveyors of the type which weigh each apple and accumulate the weight of those apples to a specified bag weight fill each bag from a single off-load conveyor. This requires an expensive bagging apparatus for each off-load conveyor, increasing the cost of the overall system and slowing the sorting and bagging of the apples unless multiple bagging apparatuses are supplied.

SUMMARY OF THE INVENTION

It is an object of this invention to increase the speed of bagging objects from a sorting conveyor by providing multiple off-loading conveyors and directing the objects that are placed on the off-load conveyors from the sorting conveyor onto guide means which deliver those objects at the specified weight to a single bagger. For example, three off-load conveyors can be directed to one bagging apparatus, thus providing a rapid flow of objects to the bagging apparatus.

DETAILED DESCRIPTION OF AN EXEMPLARY EMBODIMENT

Figure 3:
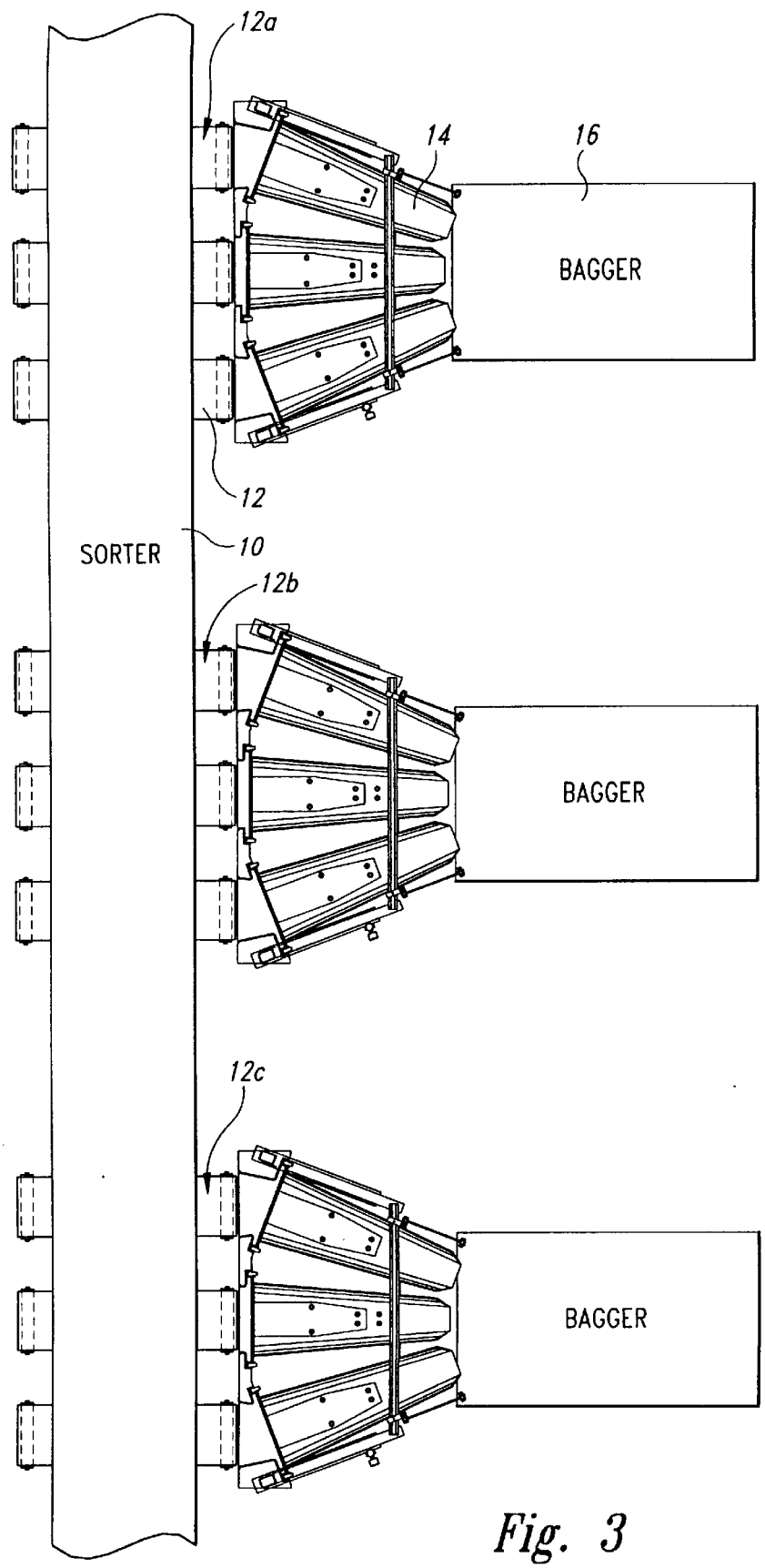
FIG. 3 is a schematic plan view showing a plurality of baggers off-loading from a single sorting conveyor.

As best shown in FIG. 3, a sorter 10 of the type suitable for sorting, weighing and accumulating the individual weights of objects such as apples or other fruit is illustrated delivering those apples to a plurality of sets of off-load conveyors 12A, 12B and 12C. Each of the conveyors in the sets of conveyors is an identical off-load conveyor 12. Each set of off-load conveyors deliver the apples to sets of chutes 14 all of the same construction. The chutes in each set, as best shown in FIG. 3, are angled into a converging pattern so that they all empty to a single bagger 16.

Figure 1:
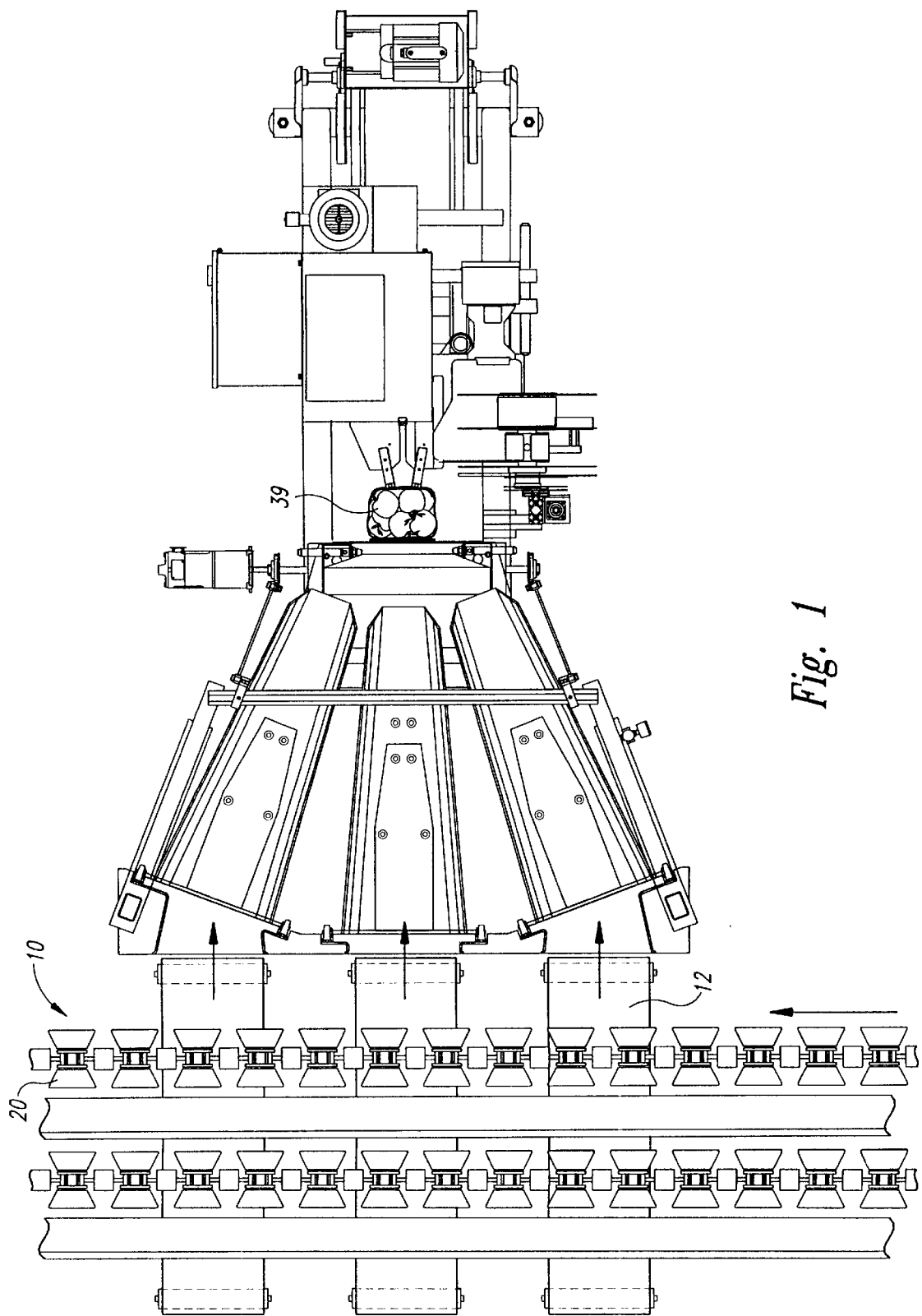
FIG. 1 is a top plan view of a sorter and bagging apparatus employing the principle of the invention.
Figure 2:
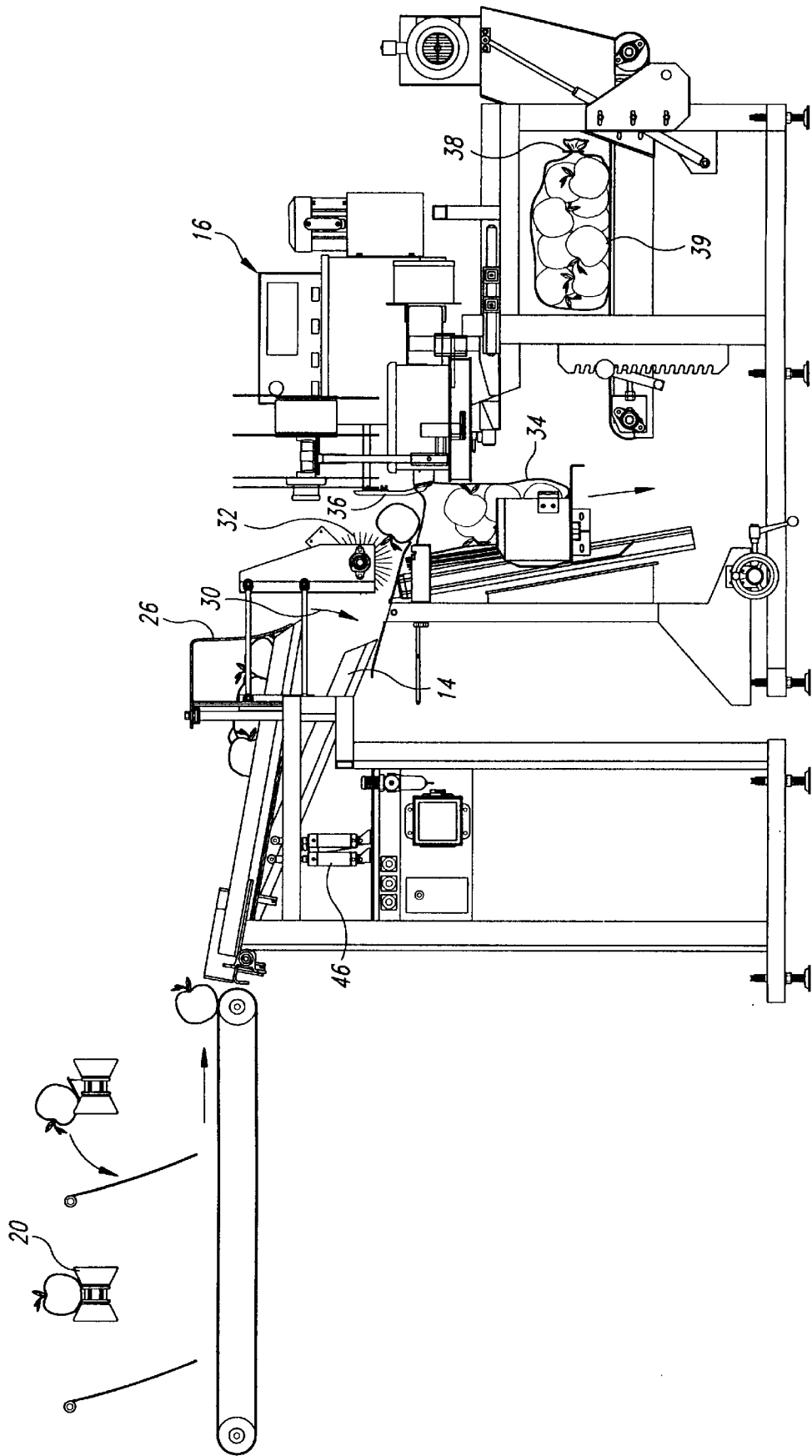
FIG. 2 is a side elevation of the sorting and bagging apparatus.

The sorting conveyor 10 is a well-known sorter manufactured by Autoline Manufacturing Company of Reedley, Calif. In this type of conveyor, a plurality of pockets 20 each hold an individual fruit, such as shown in FIG. 2, and weigh each fruit in each pocket. Using a conventional type of computing device, such as a personal computer (PC) 22, thereafter the weight of fruit off-loaded to each off-load conveyor 12 is accumulated so that the specified weight for a bag of apples is collected at each off-load conveyor. When the fruit then are at the specified weight on a chute, the chute drops to the lowered position shown in FIG. 2 which is indicated by the direction of the arrow 30. The other two chutes still remain in a raised position and the apples accumulated on those chutes are held by a common gate 26. As best shown in FIG. 2, the speed at which the apples roll off the lowered chute 14 is controlled by a rotating brush 32. The brush rotates in a counterclockwise direction as shown in FIG. 2. If the brush is rotated slowly, the fruit, such as apples can be handled more carefully and gently. If the apples are very hardy or are another kind of hardy fruit, the brush can be rotated more rapidly to deliver the apples or fruit to the bagging device or bagger 16 more quickly.

The bagging device 16 is of a conventional construction having a plurality of plastic bags 34 held on wickets. A machine of a type used for that purpose is described in U.S. Pat. No. 3,822,527, the description of which is incorporated herein. The bags are individually opened by a finger 36, allowing the apples to fall into the open bag. The finger 36 is rigidly connected to a pneumatic finger actuator 37 which is operable to move the finger 36 in a cyclic motion to open one of the bags 34. When the bag is full, the filled bag is moved to the right in FIG. 2 through a conventional bag closing device where a closure 38 is attached to the gathered neck of the bag as shown, for example, in the filled bag 39 in FIG. 2.

The brush 32 is driven by a conventional motor 40 which is controlled by a conventional programmable logic controller (PLC) 44. The chutes are individually raised and lowered by hydraulic or pneumatic chute actuators 46 also controlled by the PLC 44.

The sorter 10 is controlled by the PC 22 to provide small objects such as items of fruit, and more particularly apples, to a selected chute 14. The PC 22 is programmed to collect data for each individual fruit transported by the sorter 10. The PC 22 identifies the selected chute 14 and causes the sorter 10 to discharge fruit from the pockets 20 to the selected chute 14 while calculating a total weight of fruit discharged. The calculation of the total weight is based on the weight of each individual fruit discharged into the selected chute 14. The PC 22 is programmed to fill the selected chute 14 with a quantity of fruit to nearly the specified weight for a full bag of fruit and calculate a difference between the total weight and the specified weight. The PC 22 then chooses a fruit having a weight within an acceptable tolerance of the difference and causes the sorter 10 to discharge the chosen fruit into the selected chute 14. The sorter 10 may pass over a number of individual fruits before the chosen fruit is positioned to be discharged into the selected chute 14, and the PC 22 may cause the sorter 10 to discharge fruit other than the chosen fruit to a chute 14 adjacent to the selected chute 14.

Figure 4:
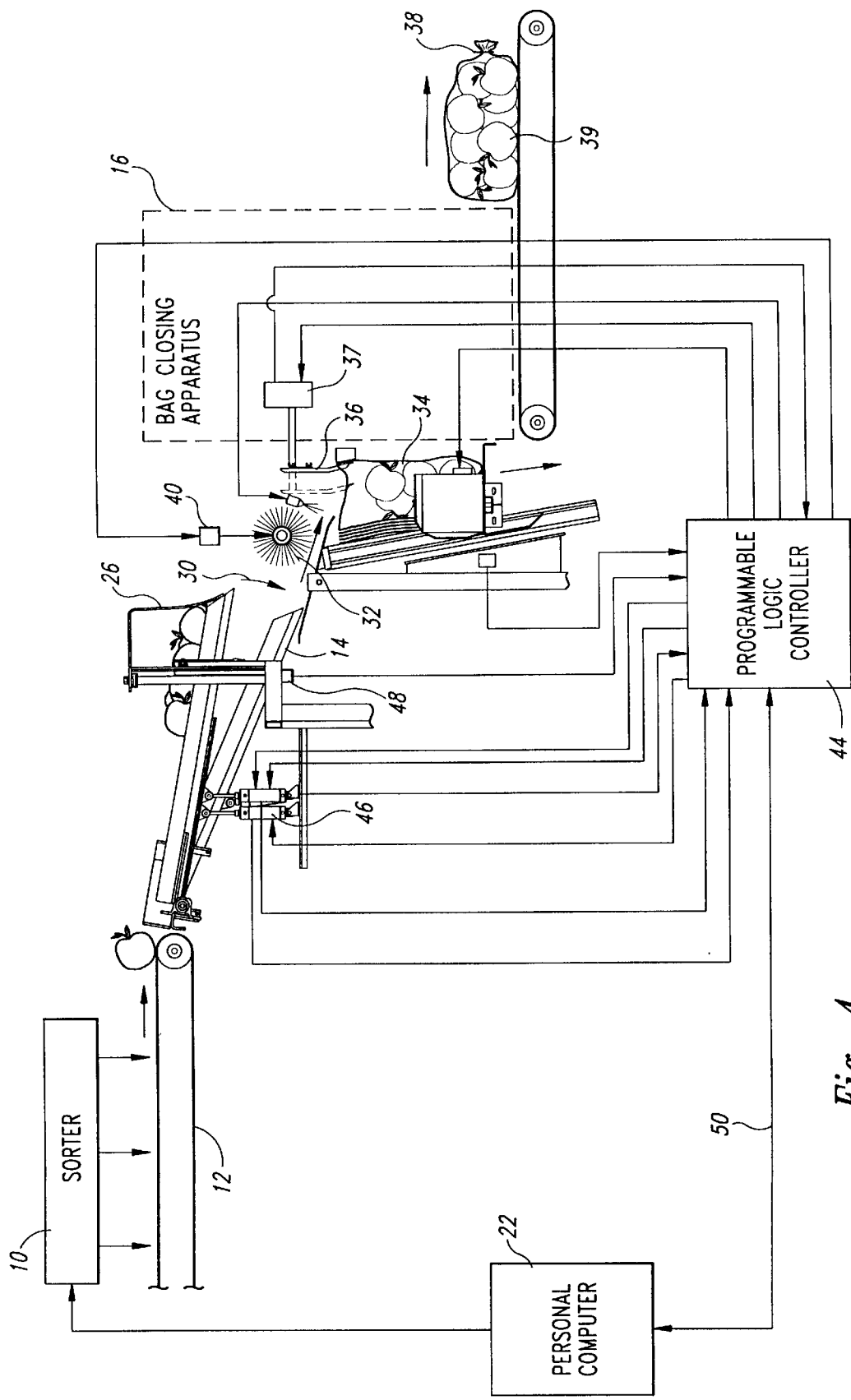
FIG. 4 is a schematic side elevation of the bagging apparatus with the sorter.

As best shown in FIG. 4, the bagger 16 is controlled by the PLC 44. As described above, the PLC 44 controls various devices on the bagger 16 such as the chute actuators 46. The PLC 44 directs one of the chute actuators 46 to lower the selected chute 14 such that the fruit in the selected chute 14 is allowed to fall or roll into an open bag 34. The PLC 44 also receives data from several sources in the bagger 16, including a signal from a magnetic reed switch 48 which is fixed on the bagger 16 below the chutes 14. The signal from the magnetic reed switch 48 indicates when one of the chutes 14 has been lowered to deliver fruit to the bagger 16. In another example, the PLC 44 provides a signal to the finger actuator 37 to cause the finger 36 to be moved to open a bag 34. The PLC 44 then receives a signal from the finger actuator 37 to indicate that a bag 34 has been opened and that the bagger 16 is prepared to receive fruit from one of the chutes 14.

The PLC 44 communicates with the PC 22 through a port 50 to coordinate the delivery of fruit from the sorter 10 to the bags 34. The port 50 may be any conventional port such as an RS 232 port.

As described above, the embodiment of the invention shown in FIGS. 1–4 includes sets of three chutes 14 arranged to deliver fruit to each bagger 16. The arrangement of three chutes 14 per bagger 16 speeds the process of delivering fruit to the bags 34 because a first chute 14 may be receiving fruit from the sorter 10 while a second chute 14 is being lowered to fill a bag 34 and a third chute 14 is receiving fruit that weights too little or too much to top off the first chute 14. The bagger 16 opens and closes the bags 34 rapidly enough to receive loads of fruit of the specified weight from each of the three chutes 14 in a sequence such that none of the chutes 14 holds the specified weight of fruit for an excessive period of time.

Figure 5:
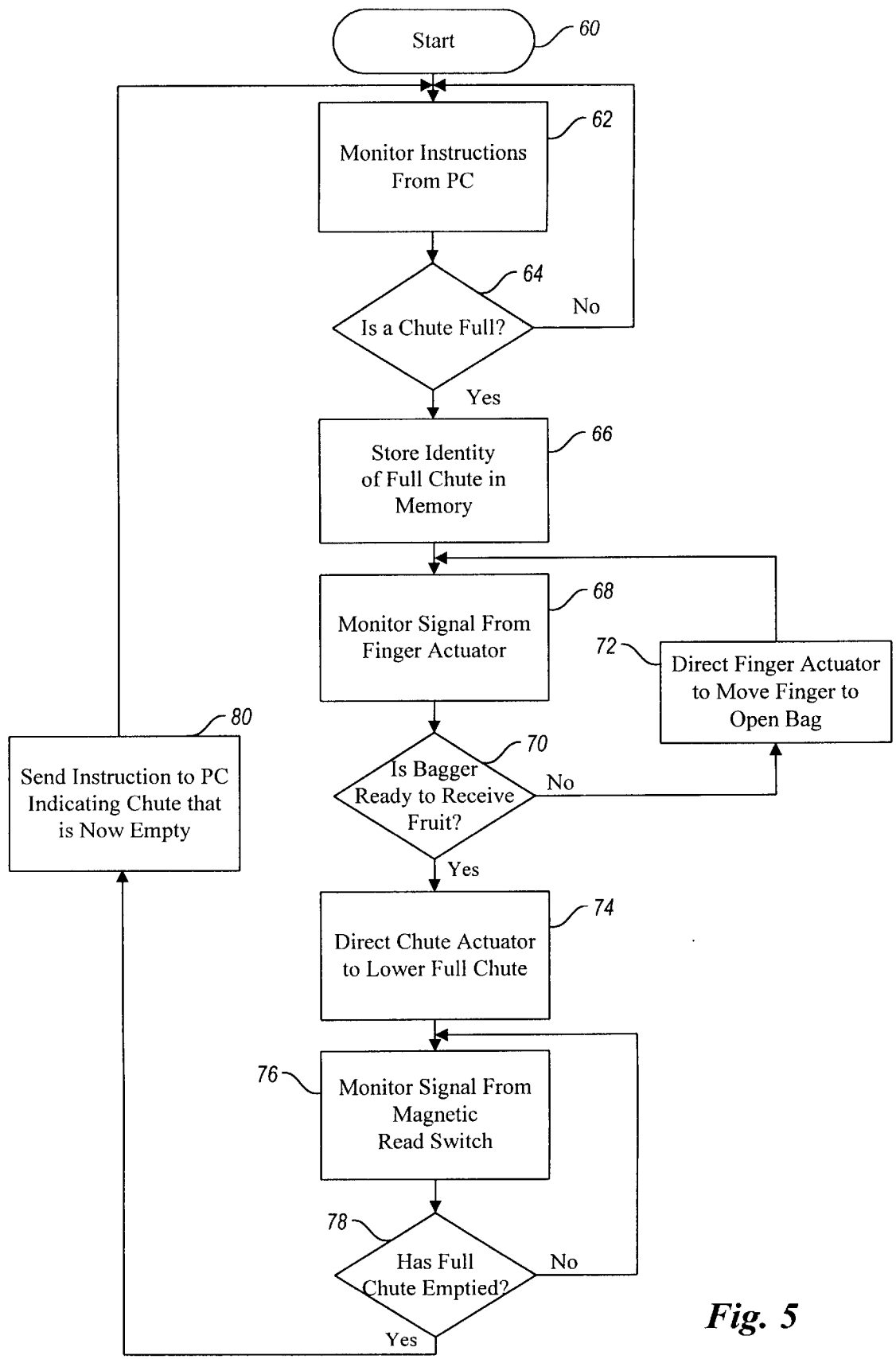
FIG. 5 is a flowchart of a software routine carried out by a programmable logic controller in the bagging apparatus of FIG. 4.

FIG. 5 is a flowchart of a software routine carried out by the PLC 44 to communicate with the PC 22 and control the bagger 16 such that fruit is delivered from the sorter 10 to the bags 34 in a rapid fashion. The PLC 44 directs the operation of the bagger 16 according to the following steps. As the operation of the bagging apparatus is beginning, the IPLC 44 initiates the software routine with step 60. In step 62, the PLC 44 monitors instructions received from the PC 22 through the port 50. In step 64, the PLC 44 determines whether the PC 22 has sent an instruction to the PLC 44 indicating that one of the chutes 14 is full. If none of the chutes 14 are full, then the PLC returns to step 62 to monitor further instructions from the PC 22. If the instruction from the PC 22 indicates that one of the chutes 14 is full, then the PLC 44 stores the identity of the full chute 14 in a memory in step 66. In step 68, the PLC 44 monitors a signal from the finger actuator 37 indicating whether a bag 34 is open. In step 70 the PLC 44 determines if the bagger 16 is ready to receive fruit from the full chute 14. If the bagger 16 is not ready to receive fruit, the PLC 44 directs the finger actuator 37 to move the finger 36 to open a bag 34 in step 72. The PLC 44 then returns to step 68 to monitor the signal from the finger actuator 37. Once the PLC 44 determines that the bagger 16 is ready to receive fruit, the PLC 44 directs a chute actuator 46 to lower the full chute 14 to allow the fruit to be directed into the open bag 34 under the brush 32 in step 74. In step 76, the PLC 44 monitors the signal from the magnetic reed switch 48 and determines in step 78 whether the full chute 14 has been emptied based on the signal. If the full chute 14 has not been emptied, the PLC 44 returns to step 76 to monitor the signal from the magnetic read switch 48. If the full chute 14 has emptied, the PLC 44 sends an instruction to the PC 22 through the port 50 to indicate that the formerly full chute 14 is now empty.

As the PLC 44 directs the bagger 16 according to the flowchart shown in FIG. 5, the PC 22 continues to provide fruit to the remaining two chutes 14 which are not full. Upon receipt of the instruction that the formerly full chute 14 is now empty, the PC 22 proceeds to direct the sorter 10 to discharge fruit to that chute 14 as required. One of the other two chutes 14 is rapidly filled to the specified weight and the PC 22 then sends an instruction to the PLC 44 identifying the new full chute 14 which the PLC 44 receives according to step 62 of the software routine. The software routine shown in FIG. 5 is run continuously by the PLC 44 until the operation of the bagging apparatus is terminated. The operation of the PLC 44 according to the software routine may be terminated by any suitable interrupt routine.

As is readily apparent, apples can be accumulated on the individual chutes. As the weight specified for a particular bag is reached on a chute, the PLC 44 directs the actuator 46 to be lowered to lower the chute to empty the apples on that chute into the bagger. As is well known, the apples can be accumulated on the chutes to a very high degree of accuracy since the PC 22 will fill the chute by waiting for the exact apple weight to top off the specified bag weight onto the chute. By feeding the multiple off-load conveyors and multiple chutes to a single bagger, it can be seen that the overall cost of the sorting and bagging apparatus is minimized while the speed of delivery of the apples and bagging remains at a high rate of speed.

While the preferred embodiments of the invention have been illustrated and described, it should be apparent that variations will be apparent to those skilled in the art. Accordingly, the invention is not to be limited to the specific embodiments illustrated in the drawings.

We claim:

1. A packaging apparatus for collecting a quantity of objects, each having a variable weight, to a specified accumulative weight, the apparatus comprising:

a plurality of off-load conveyors;

a sorter conveyor having a plurality of holders that each contain one of the quantity of objects, each of the plurality of holders weighing the object contained in the holder to provide a weight measurement of each object and discharging the objects onto the off-load conveyors;

a control device to receive the weight measurements and thereby determine an accumulative weight of objects discharged onto each off-load conveyor until the accumulative weight of objects on each off-load conveyor reaches a specified accumulative weight;

a packaging device;

a plurality of chutes for gathering the objects from each off-load conveyor and guiding the objects to the packaging device wherein the objects having the specified accumulative weight can be gathered from more than one off-load conveyor and packaged at a single packaging device; and a rotating brush positioned between the plurality of chutes and the packaging device to control the movement of objects from a selected one of the plurality of chutes to the packaging device.

2. The packaging apparatus of claim 1 wherein the rotating brush rotates at variable speeds and the speed of rotation is selected based on the type of objects to be packaged.

3. The packaging apparatus of claim 1, further comprising a gate for holding the objects on the chutes, and means for activating each chute separately to allow the objects on the activated chute to pass the gate.

4. The apparatus of claim 3 wherein the rotating brush is positioned between the gate and the packaging device.

5. A bagging apparatus for bagging a specified weight of apples for each bag to be filled, comprising:

a plurality of collecting means;

means for accumulating the specified weight of apples onto said plurality of collecting means, each collecting means holding the specified weight of apples;

a single bagging means for a plurality of collecting means for placing the apples into a bag;

guide means for guiding the apples from the plurality of collecting means into the bagging means whereby several sets of apples of the specified weight may be collected simultaneously and then guided into the single bagging means, and a rotating brush associated with the guide means to facilitate movement of the apples into the bagging means.

6. The bagging apparatus of claim 5 wherein the rotating brush rotates at a variable speed and the speed of rotation is selected based on the hardiness of the apples.

7. The bagging apparatus of claim 5, said guide means including a plurality of chutes, and a gate for holding the apples on the chute.

8. The bagging apparatus of claim 5, said means for accumulating the specified weight of apples including a sorting conveyor having a plurality of pockets, each pocket holding an individual apple and weighing the apple in each pocket.

9. The bagging apparatus of claim 8, said guide means including a plurality of chutes, and a gate for holding the apples on the chute.

10. The bagging apparatus of claim 9, said gate overlying all of the chutes, the apples being released to roll off the chutes into the bagging means by lowering selected chutes so that the apples pass below the gate and can roll freely down the chute.

11. The bagging apparatus of claim 10, including a rotating brush overlying the chutes to control the speed with which the apples pass down the chute.

* * * * *